United States Patent Office 2,854,323
Patented Sept. 30, 1958

2,854,323

FUEL OIL COMPOSITION

Kwan-ting Shen, Brentwood, Verner L. Stromberg, Shrewsbury, and Alvin Howard Smith, Glendale, Mo., assignors to Petrolite Corporation, Wilmington, Del., a corporation of Delaware No Drawing. Application November 9, 1955
Serial No. 546,003

14 Claims. (Cl. 44—66)

See our co-pending application, Serial No. 546,004, filed November 9, 1955.

The present invention pertains to the improvement of hydrocarbon fuel. More specifically, this invention pertains to the improvement of hydrocarbon fuels, and particularly to fuel oil compositions capable of preventing or inhibiting the sludging and/or clogging tendencies generally exhibited by hydrocarbon fuels, such as those utilized in burner systems, tanks, diesel and combustion engines, and other industrial and domestic equipment. In addition, this invention relates to fuel compositions capable of removing preformed deleterious matter from filters, screens, and the like which deleterious matter is formed by deterioration and/or the presence of foreign bodies (e. g. water) in the fuel oils. Stabilization of color or, stated another way, prevention of color deterioration, is one of the advantages obtained by the present invention.

It is well known that the sludge which occurs in certain fuels can be prevented or inhibited by various chemical compounds of chemical products. For instance, U. S. Patent 2,559,574, dated July 3, 1951, to Weissberg, is concerned with a method of dispersing petroleum sludge which comprises bringing the surface of the sludge into contact with a solution of a minor proportion of an oil-soluble and hydrophile surface active agent.

Said aforementioned co-pending application, Serial No. 546,004, filed November 9, 1955, is concerned with a fuel oil composition comprising a major portion of a hydrocarbon fuel oil and a minor portion, sufficient to stabilize the fuel oil against the formation of sludge and undesirable color bodies, of a member of the class consisting of (A) an oil-soluble and surface-active chemical compound having the following characteristics; (a) at least 2 nitrogen atoms; (b) at least one basic nitrogen atom; (c) at least one alkyleneoxy radical derived from alkylene monoepoxide having not more than 4 carbon atoms, and (d) at least one acyl radical derived from a carboxy acid having at least 8 carbon atoms for each carboxyl group present; and (B) salts thereof.

The present invention is concerned with the subgenus of the broad invention described in aforementioned copending application, Serial No. 546,004, and represents a class of additives which have unusual and unexpected merit in comparison with the broad genus as a whole.

More specifically, the present invention is concerned with a fuel oil composition comprising a major portion of a hydrocarbon fuel oil and a minor portion, sufficient to stabilize the fuel oil against the formation of sludge and undesirable color bodies, of a member of the class consisting of (A) an oil-soluble and surface-active chemical compound having the following characteristics: (a) at least 2 nitrogen atoms; (b) at least one basic nitrogen atom; (c) at least one alkyleneoxy radical derived from alkylene monoepoxide having not more than 4 carbon atoms; (d) one acyl radical derived from a higher fatty acid having at least 8 carbon atoms; (e) one acyl radical being present as part of an ester radical; (f) said compound being free from any cyclic radical; and (B) salts thereof.

Hydrocarbon fuels which are improved in the manner herein described include not only distillate fuels but also residual fuels. For example, in regard to distillates, those having a normal distillation range of from about 300° F. to about 700° F., and particularly those from about 340° F. to about 640° F., generally have a marked tendency to deteriorate under oxidizing conditions, and to form sludge. Also, the presence of impurities in such fuels, such as the presence of moisture, dispersed water, organic and/or inorganic foreign matter, and the like, causes the formation of insoluble products which tend to settle out and adhere to surface with which they come in contact, thereby in turn, causing clogging or plugging of filters, strainers, screens, conduit lines, and the like, of the equipment in which they are used. This necessitates frequent cleaning and even replacement of parts, thereby markedly decreasing the performance efficiency of various equipment which utilizes such fuel oils.

The problem of screen clogging is common, particularly in domestic fuel oil systems employing distillate fuel oils produced by distilling or cracking of petroleum, which fuels are characterized by their relatively low viscosity and other properties. Fuel oils of this type generally conform to the specifications set forth in Commercial Standards C. S. 12–40 for Nos. 1, 2 and 3, Fuel Oils. Petroleum distillates within the ranges specified and which generally do not exceed 700° F., and preferably are below 675° F., for use as diesel fuels, are further examples of the type of oils which under conditions described herein have a tendency to clog screens or filters, particularly when such fuels contain minor amounts of water dispersed therein.

Another place where screen clogging and plugging of conduit lines is encountered is in fuel oil storage tanks, which latter may be connected to burner systems or engines, etc. The stored fuel generally comes in contact with air, moisture, etc., which cause formation and precipitation of sludge materials, the latter depositing on and clogging the screens or filters used for protecting the burners or engines using such fuel oils.

It is an objective of this invention to inhibit sludging tendencies of hydrocarbon fuel oils. It is another objective to inhibit sludging and precipitation of contaminants in hydrocarbon distillate fuel oils, particularly in cracked hydrocarbon fuels. It is still another objective to provide distillate fuel oils, particularly fuel oils obtained during cracking of hydrocarbons, which fuel oils have excellent performance characteristics with respect to freedom from screen clogging, even after extensive storage under oxidizing conditions and in the presence of water. Still another objective is to provide a distillate fuel oil composition which is effective in removing preformed sludge deposits formed in fuel oil systems. Still another objective is to provide a particular type of distillate fuel oil composition or a blend thereof, which is non-corrosive, stable, and effective for removing sludge and for cleaning metal surfaces. Another objective is to inhibit the rusting tendencies of fuel oils.

The above and other objects of this invention may be attained by dispersing, admixing with or dissolving in hydrocarbon fuel oils (which normally have a tendency to cause clogging or plugging of screens or the like), a minor amount, which amount, however, is sufficient to inhibit said tendencies, of one or more surface-active hydroxy amino esters or the like, and derivatives thereof. If desired, a minor amount of a detergent and/or solubilizer may also be added to the composition.

The hydrocarbon distillate fuel oils in which the active ingredient and/or ingredients of this invention are dispersed or dissolved may be treated or untreated cracked fuel oils, or mixtures of cracked fuels with straight run fuel oils, said fuel oils having components normally distilling from about 300° F. to about 700° F. Preferred fuels have a boiling range of from about 340° F. to about 700° F., and particularly from about 400° F. to about 675° F. Specifically, hydrocarbon distillates which are utilized as bases in compositions of this invention are cracked gas oils, fuel oils, furnace oils, burner oils, Diesel fuel oils, kerosene, etc., or mixtures of said cracked fuels with the corresponding or like straight run hydrocarbon fractions.

The additives here employed for combination with hydrocarbon fuels are most advantageously derived from commercially available polyethyleneamines having 2 to 5 nitrogen atoms. They are preferably subjected to oxyalkylation with butylene oxide, propylene oxide, and ethylene oxide, and preferably the latter. A mixture of oxides can be used. The initial polyamines are, of course, basic in character, the oxyalkylated amines are also basic in character, and the ester derived therefrom is also basic.

At this point it may be well to point out some of the obvious differences between the sub-genus herein defined in comparison with the broad class of materials described in our co-pending application, Serial No. 546,004. Said broad class does not require that the acyl radical present be in the form of an ester because it may also be in the form of an amide. Furthermore, in said broad class of materials one may employ compounds having a cyclic radical present as, for example, a morpholine radical. One may also obtain such additives by use of a polycarboxy acid. One need not employ a higher fatty acid but may use acids obtained from petroleum such as naphthenic acids, resin acids, etc.

In contradistinction the present and outstanding class of additives are obtained in such manner that the acyl radical is present only as part of an ester radical and is derived from a higher fatty acid, i. e., a monocarboxy acid. The compounds employed are limited to those being free from the cyclic radical. In the present specification reference to the presence of cyclic radicals is concerned with the surface-active material as such and not the salts thereof, i. e., in all instances salts can be prepared from cyclic acids such as benzoic acid, substituted benzoic, naphthenic acids, abietic acids, phenylstearic acid, etc. The limitation as far as the expression "noncyclic" is concerned is not intended to exclude the use of cyclic acids for neutralization if desired. Other differences which characterize the much preferred sub-generic class herein described will be evident in light of the subsequent text. Furthermore, in the subsequent text at least some of the tables will show results obtained by typical members of the broad genus (other than members of the present sub-genera) and the herein described sub-genera. The purpose is to show the increased effectiveness of the herein described additives as compared with typical members of the broad class and described in our co-pending application, Serial No. 546,004, filed November 9, 1955.

The final product as such or in salt form of course must be oil-soluble as herein specified. It is to be noted that many of the products have at least 3 or more basic amino radicals and may have as many as 5 or 6. This would apply to an oxyalkylated heptamine which was subsequently converted into an ester. In a number of instances the products are improved by conversion into salts or at least partial salts, i. e., neutralization of at least part of the basicity of the compound by means of various acids including not only the acids herein specified as reactants but also other acids. The products as such or in the form of salts must be solvent-soluble, either in water, or in any organic solvent, which may be a hydrocarbon solvent, or an oxygenated solvent, or a mixture of such solvents. This applies to the product as such or the salt form as, for example, after total or partial neutralization with acetic acid, glycolic acid, lactic acid, glyconic acid, or the like. Thus, such products and the salts may be dissolved in or mixed with benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleums, etc., may be employed as diluents. One may use solvents having a common solvent effect, such as the methyl, ethyl, propyl and butyl ethers of various glycols, diglycols and triglycols, such as the ethers corresponding to ethyleneglycol, diethyleneglycol, triethyleneglycol, propyleneglycol, dipropyleneglycol, tributyleneglycol, etc. Moreover, as previously pointed out one can use mixtures of one or more of these solvents but in any event the product as such, or in the salt form as noted, must be organic solvent-soluble.

In addition to the other objectives of the present invention it is also to be noted that one objective of this invention is to provide hydrocarbon fuel oils of improved stability against the formation of undesirable color bodies as well as the development and settling out of insoluble materials in storage. Furthermore, the presence of the additive in the fuel oil tends to "fluidize" old sludge deposits.

Briefly stated, then, the present invention is concerned in its preferred form with the improvement of a fuel oil by the addition of an oil-soluble and hydrophilic surface-active agent as herein described.

For purpose of convenience, what is said hereinafter will be divided into seven parts:

Part 1 is concerned with suitable monocarboxy acids which may be used to introduce the acyl radical;

Part 2 is concerned with suitable polyamines which may be subjected to reaction with an olefin oxide as hereinafter described;

Part 3 is concerned with suitable olefin oxides;

Part 4 is concerned with the oxyalkylation of polyamines;

Part 5 is concerned with the esterification of the oxyalkylated amines derived in the manner described in Part 4;

Part 6 is concerned with combinations of the products described in Part 5, preceding, with either low molal acids or high molal acids as, for example, higher fatty acids or detergent-forming acids to form salts; and Part 7 is concerned with the improvement of hydrocarbon fuels by means of the addition products described in Part 6, preceding.

PART 1

The acid which may be employed can be a high molal monocarboxy detergent-forming acid, such as a saturated or unsaturated aliphatic acid having at least 8 or not over 32 carbon atoms. Suitable acids are caprylic, capric, stearic, oleic, ricinoleic, lauric, palmitic, hydroxystearic, fatty acids derived from animal or vegetable sources, for example, cocoanut oil, rapeseed oil, palm oil, olive oil, cottonseed oil, fish oils, etc. Such acids combine with soluble bases, such as caustic soda or caustic potash, to give soap or detergent-like materials.

Although many of the examples herein described are derivatives of high molal acids for the reason that such radical adds oil solubility as well as other desirable characteristics, it is to be emphasized in the broadest aspect the present invention includes the use of low molal acids such as acetic acid, butyric acid, and the like. Products obtained from such low molal acids are of definite interest as such and also as admixtures of similar derivatives derived from high molal acids.

PART 2

The polyamines herein employed must have at least one reactive hydrogen atom. This can be illustrated very simply by reference to ethylene diamine and its derivatives. If three of the amino hydrogen atoms in ethylene diamine were replaced by a methyl group, for example, such product could be oxyalkylated and then esterified to yield a product of the kind herein described. It happens that almost invariably substituted polyamines (other than substituted polyamines obtained by oxyalkylation) are more expensive than the precursory compound. For instance, alkylated polyamines are much more expensive than the parent polyamines. It is understood that conventional substituent groups may be present in the polyamines such as alkyl radicals having less than 8 carbon atoms, cyclohexyl radicals, benzyl radicals, morpholine radicals, furfuryl radicals, or the like, provided such substituents if present do not have more than 8 uninterrupted carbon atoms. From a practical standpoint and also from the standpoint of brevity, what is said herein is concerned largely with the unsubstituted polyamines.

One may use polyamines corresponding to the formula

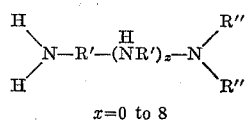

$x=0$ to $8$ in which R'' is hydrogen, alkyl, cycloalkyl, aryl, or aralkyl and R' is a divalent radical such as

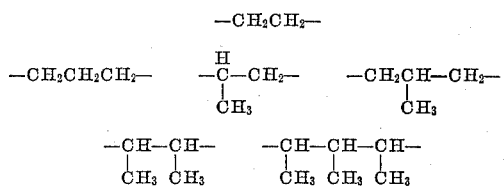

Stated another way, the polyamines have at least one primary amino group separated from another primary or secondary amino group by 2 to 4 carbon atoms. Examples of suitable amines include:

Ethylenediamine
Diethylenetriamine
Triethylenetetramine
Tetraethylenepentamine
Propylene diamine
Dipropylenetriamine
Tripropylenetetramine
Butylenediamine
Aminoethylpropylenediamine
Aminoethylbutylenediamine
Bisiminopropylenediamine

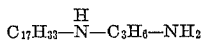

Other polyamines in which the nitrogen atoms are separated by a carbon atom chain having 4 or more carbon atoms include the following: Tetramethylenediamine, pentamethylenediamine, and especially hexamethylenediamine. The latter is of particular interest because the product is commercially available in light of its use in the manufacture of synthetic fibre.

If desired, one can prepare a variety of reactants having two or more amino groups and at least one hydroxyl group. One may use modifications of procedures or the procedures themselves as described in U. S. Patents Nos. 2,046,720, dated July 7, 1936, to Bottoms; 2,048,990, dated July 28, 1936, to Britton et al.; 2,447,821, dated August 24, 1948, to Sankus; and 1,985,885, dated January 1, 1935, to Bottoms. Examples include the following:

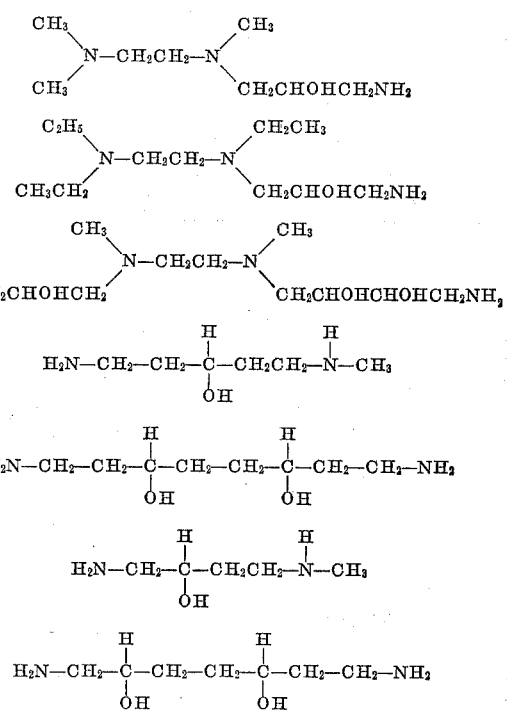

Other suitable amines and somewhat related amines are exemplified by ethylenebisoxypropylamine,

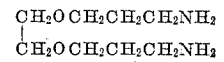

and derivatives obtained by treating ethylenebisoxypropylamine with 1, 2, 3 or 4 moles of ethylene oxide, propylene oxide, butylene oxide, or the like.

An amine can also be subjected to oxyalkylation, then esterified and subjected to further oxyalkylation.

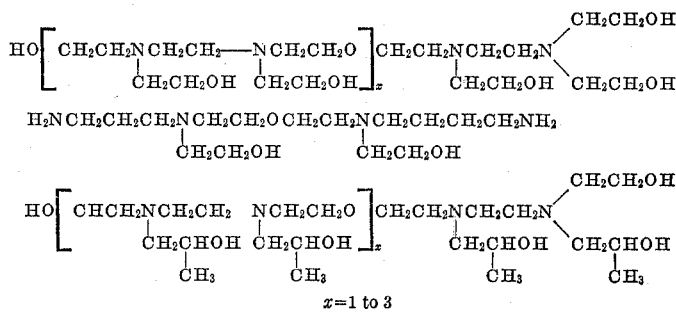

$x=1$ to $3$

PART 3

As previously stated the olefine monoxides are those which have 4 carbon atoms or less, thus including ethylene oxide, propylene oxide, butylene oxide, glycide and methylglycide. Our preference is to use butylene oxide, propylene oxide, and ethylene oxide and particularly certain combinations as previously noted. Reference to butylene oxide is concerned with the straight chain isomers and particularly with commercial butylene oxide which is a mixture of the straight chain isomers with little or no isobutylene oxide present.

PART 4

The oxyalkylation of polyamines and particularly basic polyamines has been thoroughly described in the literature; in fact the procedure is substantially the same as the oxyalkylation of basic monoamines. Such procedure is illustrated in the following patents:

| U. S. Patent No. | Dated | Inventor |
| --- | --- | --- |
| 2,586,770 | Feb. 26, 1952 | Alm. |
| 2,642,412 | June 16, 1953 | Newey et al. |
| 2,644,760 | July 7, 1953 | Schroeder. |
| 2,679,510 | May 25, 1954 | De Groote. |
| 2,679,511 | ___do___ | Do. |
| 2,679,512 | ___do___ | Do. |
| 2,679,513 | ___do___ | Do. |
| 2,679,514 | ___do___ | Do. |
| 2,679,515 | ___do___ | Do. |

The oxyalkylation of the polyamines may involve as many as 30 moles of the monoepoxide per mole of amine. One may use a single oxide such as ethylene oxide, propylene oxide, butylene oxide, or the like, or one may use a mixture as, for example, propylene oxide and ethylene oxide, or butylene oxide and ethylene oxide. An oxyalkylated product may be combined with an acid such as a higher fatty acid and then subjected to further oxyalkylation. All such procedures are well known and require no description beyond what is available in the literature but are illustrated by subsequent examples.

Purely by way of illustration a number of examples are included illustrating the oxyalkylation of polyamines:

Example 1a

Into a stainless steel oxyalkylator was charged 130 pounds of diethylene triamine. The reactor consisted of a closed pressure type vessel, with turbine agitator, gas inlet tube, cooling and heating coils, and the usual inlets and outlets. After flushing the reactor with nitrogen, the contents were reacted up to 125° C. At this point, 220 pounds of ethylene oxide were passed into the contents beneath the turbine via the gas inlet tube. About 2.5 hours were required to complete the reaction. During the oxyethylation the temperature was held at 125° C. and a maximum pressure of 25 p. s. i. g. developed. The product was a medium viscous, light brown liquid when cool.

Example 2a

Into the aforedescribed oxyalkylator were charged 103 pounds of an amine called "9–10 amine." This amine is made by the Matheson Olin Company and is primarily a crude diethylene triamine. As in Example 1b, following, ethylene oxide was gradually admitted at 125° C. When 198 pounds of the oxide had been added, the reaction rate was almost zero. About 4 hours were required to reach this point, and the batch was stirred one more hour after the oxide addition was stopped before cooling it down. The product was similar to that of Example 1b, but slightly darker.

Example 3a

Example 1a was repeated. At the end of the reaction, the batch was cooled, and .1 pound of powdered sodium hydroxide added. An additional 132 pounds of ethylene oxide was then added, at 125° C. 1.5 hours were required.

Example 4a 103 pounds of diethylene triamine were reacted with 290 pounds of propylene oxide. Since no catalyst was used, about 6 hours at 125° C. was required to complete the reaction. The product was similar in appearance to that of Example 1a.

Example 5a

Into the reaction vessel described in Example 1a was charged 60 pounds of anhydrous ethylene diamine, 176 pounds of ethylene oxide was added over a 4-hour period at 125° C.

Example 6a

Another batch of Example 5a was made. To this was added 0.1 pound of powdered sodium hydroxide. 176 pounds of ethylene oxide were added over a 2.5 hour period at 125° C.

Example 7a

Example 5a was repeated except that 456 pounds of propylene oxide were used, instead of ethylene oxide. The reaction was carried out in the same manner, i. e., two stages.

Example 8a 146 pounds of triethylene tetramine were reacted with 220 pounds of ethylene oxide over a 3-hour period at 125° C. The maximum pressure was 22 p. s. i. g.

Example 9a

Example 8a was repeated. To this batch was added 0.1 pound of powdered sodium hydroxide. An additional 220 pounds of ethylene oxide were added at 125° C. About 2 hours were required to complete the reaction.

Example 10a

Example 8a was repeated using propylene oxide in place of ethylene oxide. 290 pounds of oxide were added in 6 hours at 125° C.

Example 11a 74 pounds of anhydrous propylene diamine were reacted with 352 pounds of ethylene oxide. The oxide was added in two stages, i. e., the first half at 125° C. with no catalyst present, and the second half at 125° C. with 0.1 pound sodium hydroxide present. A total addition time of 7 hours was required.

Example 12a 88 pounds of N-methylaminopropylamine were reacted with 264 pounds of ethylene oxide. 0.05 pound of sodium hydroxide had been added as catalyst. The reaction was completed in 3 hours at 125° C.

Example 13a

To 103 pounds of diethylene triamine was added a mixture of alkylene oxides composed of 88 pounds of ethylene oxide and 116 pounds of propylene oxide. About 5 hours were required to complete the reaction at 125° C.

Example 14a

A three-stage oxyalkylation of triethylene tetramine, 146 pounds was conducted at 125° C. In the first stage, 290 pounds of propylene oxide were added in 7 hours. In the second stage, 0.2 pound of sodium hydroxide catalyst was used, and an additional 290 pounds of propylene oxide added. In the final stage, 176 pounds of ethylene oxide were added. The product was a light colored, medium viscous liquid.

Example 15a

To 60 pounds of ethylene diamine were added 360 pounds of butylene oxide. 0.1 pound of sodium hydroxide was used as catalyst. The reaction took 10 hours at 125° C. To this product then were added 220 pounds of ethylene oxide over a 4-hour period.

Example 16a 232 pounds of propylene oxide were added to 74 pounds of anhydrous propylene diamine. About 5 hours were required at 125° C., 20 p. s. i. g. After addition of 0.05 pound of sodium hydroxide, 176 pounds of ethylene oxide were added over a 3-hour period.

Example 17a

To 146 pounds of triethylene tetramine were added 176 pounds of ethylene oxide. 4 hours at 125° C. were required for the addition. 0.05 pound of sodium hydroxide were then added and 116 pounds of propylene oxide added in 2 hours.

Example 18a

To a batch of product as made in Example 4a were added 176 pounds of ethylene oxide. 0.05 pound of sodium hydroxide was added as catalyst for this second stage of oxyalkylation. The reaction took 3 hours at 125° C.

The above examples, together with other examples, are summarized in Table II, immediately following:

TABLE I

| Ex. No. | Amine | Lbs. of amine | Oxide | Lbs. of oxide | Temp., °C. | Catalyst | Reaction time, hrs. |
|---|---|---|---|---|---|---|---|
| 1a | Diethylene triamine | 130 | Ethylene | 220 | 125 | | 2.5 |
| 2a | "9–10 amine" | 103 | do | 198 | 125 | | 5 |
| 3a | Diethylene triamine | 130 | do | 352 | 125 | Sodium hydroxide | 4 |
| 4a | do | 103 | Propylene | 290 | 125 | | 6 |
| 5a | Ethylene diamine | 60 | Ethylene | 176 | 125 | | 4 |
| 6a | do | 60 | do | 352 | 125 | Sodium hydroxide | 6.5 |
| 7a | do | 60 | Propylene | 456 | 125 | do | 6.5 |
| 8a | Triethylene tetramine | 146 | Ethylene | 220 | 125 | | 3 |
| 9a | do | 146 | do | 440 | 125 | Sodium hydroxide | 5 |
| 10a | do | 146 | Propylene | 290 | 125 | | 6 |
| 11a | Propylene diamine | 74 | Ethylene | 352 | 125 | | 7 |
| 12a | N-methylaminopropylamine | 88 | do | 265 | 125 | Sodium hydroxide | 3 |
| 13a | Diethylene triamine | 103 | {Ethylene / Propylene} | {88 / 116} | 125 | | 5 |
| 14a | Triethylene tetramine | 146 | {Propylene / Ethylene} | {580 / 176} | 125 | Sodium hydroxide | 7 |
| 15a | Ethylene diamine | 60 | Butylene | 360 | 125 | do | 10 |
| 16a | Propylene diamine | 74 | {Propylene / Ethylene} | {232 / 176} | 125 | do | 8 |
| 17a | Triethylene tetramine | 146 | {Ethylene / Propylene} | {176 / 116} | 125 | do | 6 |
| 18a | Diethylene triamine | 103 | {Propylene / Ethylene} | {290 / 176} | 125 | do | 9 |
| 19a | {Diethylene triamine / Triethylene tetramine} | {65 / 73} | {Ethylene / Propylene} | {176 / 145} | 125 | do | 7 |
| 20a | Hexamethylenediamine | 116 | Ethylene | 176 | 125 | | 5 |

PART 5

The acylation and more particularly the esterification of oxyalkylated polyamines, i. e., amino alcohols, is well known and has been described in the literature, particularly in the patent literature. See, for example, the following patents:

| U. S. Patent No. | Date | Inventor |
|---|---|---|
| 2,626,912 | Jan. 27, 1953 | De Groote. |
| 2,626,915 | do | Do. |
| 2,626,917 | do | Do. |
| 2,626,918 | do | Do. |
| 2,626,919 | do | Do. |
| 2,662,857 | Dec. 15, 1953 | Carroll. |
| 2,568,743 | Sept. 25, 1951 | Kirkpatrick. |
| 2,568,747 | do | Do. |
| 2,525,770 | Oct. 17, 1950 | Cook. |

It is not believed any description is necessary but by way of example the following are included:

Example 1b

Into a stainless steel reaction vessel with turbine agitator, cooling and heating coils, temperature controller, reflux and distillate recovery system, and the usual inlets and outlets, was placed the product of the reaction described in Example 1a, followed by 284 pounds of stearic acid. Sufficient xylene was then added to maintain a pot temperature of 160° C. at reflux. Reflux, with water separation and stirring, was maintained until 18 pounds of water had been removed. This required approximately 6 hours. The brown viscous liquid then was allowed to cool and adjusted to 50% activity by the addition of xylene.

Example 2b

Using the reaction vessel and conditions as described in Example 1b, the monoester of the material produced in Example 2a was prepared with 300 pounds of General Mills' fatty acid "Aliphat 33F." This is a distilled cottonseed fatty acid. The product was a brown viscous liquid and it and all following preparations were adjusted to 50% activity with xylene.

Example 3b

Using all conditions as in Example 1b except the initial charge was the product of reaction Example 4a and stearic.

Example 4b

The product of Example 6a was esterified with 256 pounds of palmitic acid using conditions described in Example 1b.

Example 5b

The product of Example 7a was esterified with 200 pounds of lauric acid using Example 1b conditions.

Example 6b

The product of Example 1a was esterified with 298 pounds of ricinoleic acid using Example 1b conditions.

Example 7b

The product of Example 11a was esterified with 256 pounds of palmitic acid using Example 1b conditions.

Example 8b

The product of Example 12a was esterified with 284 pounds of stearic acid using 1b conditions.

Example 9b

The product of Example 14a was esterified with 298 pounds of ricinoleic acid using 1b conditions.

Example 10b

The product of Example 15a was esterified with 256 pounds of palmitic acid using 1b conditions.

The above examples are summarized in Table III, immediately following:

TABLE II

| Ex. No. | Amino alcohol | Wt., lbs. | Acid | Wt., lbs. | Temp., °C. | Reaction time, hrs. |
|---|---|---|---|---|---|---|
| 1b | 1a | 350 | Stearic | 284 | 160 | 6 |
| 2b | 2a | 301 | "Aliphat 33–F" | 300 | 160 | 6 |
| 3b | 4a | 393 | Stearic | 284 | 160 | 6 |
| 4b | 6a | 412 | Palmitic | 256 | 160 | 6 |
| 5b | 7a | 516 | Lauric | 200 | 160 | 6 |
| 6b | 11a | 350 | Ricinoleic | 298 | 160 | 6 |
| 7b | 11a | 426 | Palmitic | 256 | 160 | 6 |
| 8b | 12a | 353 | Stearic | 284 | 160 | 6 |
| 9b | 14a | 902 | Ricinoleic | 298 | 160 | 6 |
| 10b | 15a | 420 | Palmitic | 256 | 160 | 6 |
| 11b | 16a | 482 | ....do | 256 | 160 | 6 |
| 12b | 3a | 482 | Oleic | 282 | 160 | 6 |
| 13b | 8a | 366 | Cocoanut oil | 210 | 160 | 6 |
| 14b | 13a | 307 | Caprylic | 144 | 160 | 6 |
| 15b | 17a | 438 | Capric | 172 | 160 | 6 |

PART 6

As previously pointed out, compounds of the type herein described obtained in a general way by reactions involving acylation and oxyalkylation yield suitable products for the use herein specified. Such products are inherently basic in character. Their effectiveness is not limited to the use of the free (anhydro) base as such but it is possible in actual use that combination with water present may or may not form the hydrated base. Similarly, these materials may combine with acidic materials present in the fuels. Furthermore, such products, i. e., the free base, can be converted into the salt form and in many instances yield a product having greater solubility in oil or some other desirable property. Reference to salt formation means either partial or total salt formation insofar that it is not necessary in all instances to neutralize all the basic nitrogen atoms or, for that matter, one might neutralize in part with one acid and in part with other acids. Of particular value are high molecular weight naphthenic acids which may be used in salt formation. Particularly desirable is the type of material sold by the Sun Oil Company under the trade name "Sunaptic Acids." These are essentially high molecular weight naphthenic acids corresponding to the formula $C_{21}H_{36}O_2$ and corresponding to a molecular weight of 320 and a theoretical acid number of 175. The acids employed for salt formation need not necessarily be acids which enter acylation reactions in the manner described, i. e., need not necessarily be carboxy acids but may be acids in which the sulfo radical appears such as sulfonic acid, particularly oil-soluble sulfonic acid comparable to those obtained from mahogany soaps or may be sulfonic acid such as obtained by sulfation of high molal alcohols or the like. Examples of salt formation are illustrated by Examples Nos. 1c to 5c, immediately following:

Example 1c

The product of Example 1b was reacted with 76 pounds of glycolic acid. The reaction was carried out in a blend tank at 60° C. over a one-hour period. The resultant product was a partial amine salt.

Example 2c

The product of Example 4b was treated with 50 pounds of lauric acid. The partial neutralization was carried out as in Example 1c.

Example 3c

The product of Example 5b was treated with 300 pounds of didodecyl benzene sulfonate in a blending tank for one hour at 50° C.

Example 4c

The product of Example 2b was treated with 74 pounds of propionic acid at 50° C. The reaction was carried out over a one-hour period.

Example 5c

The product of Example 6b was allowed to combine with 225 pounds of mahogany sulfonate at a temperature of 50° C.

Additional samples, including some in which oil-soluble petroleum sulfonic acids or other oil-soluble sulfonic acids have been used, are included in Table V, following. Such oil-soluble sulfonic acids include among others sulfonic acids obtained from keryl benzene foots, from dinonylphenol foots, and from detergent alkylate foots. Similarly, sulfonic acids obtained from di(dodecyl)benzene may be used. Sulfonic acids having a carboxyl radical also may be used, such as sulfo phenyl stearic acid.

TABLE III

| Ex. No. | Compound | Wt., lbs. | Acid | Wt., lbs. | Temp., °C. | Reaction time, hrs. |
|---|---|---|---|---|---|---|
| 1c | 1b | 616 | Glycolic | 76 | 60 | 1 |
| 2c | 4b | 650 | Lauric | 50 | 50 | 1 |
| 3c | 5b | 698 | Didodecyl benzene sulfonate | 300 | 50 | 1 |
| 4c | 2b | 583 | Propionic | 74 | 50 | 1 |
| 5c | 6b | 630 | Mahogany sulfonate | 225 | 50 | 1 |
| 6c | 9b | 1,182 | Acetic | 30 | 50 | 1 |
| 7c | 11b | 720 | Napthenic acid (Sunaptic acid A) | 300 | 60 | 1 |
| 8c | 13b | 558 | Kerylbenzene foots sulfonate | 350 | 50 | 2 |
| 9c | 15b | 592 | Sulfo-phenyl stearic acid | 245 | 50 | 2 |
| 10c | 15b | 592 | Mahogany sulfonate | 225 | 50 | 1 |

PART 7

Part 7 is concerned with the improvement of hydrocarbon fuels by the addition of compounds of the kind described in Parts 5 and 6 preceding, to fuel oils in order to improve their properties.

Another property which additives contribute to fuel oil is the property of rust inhibition. It has been noted previously that moisture collects in fuel tanks for an obvious reason. As a corollary thereto it follows that moisture in an iron container usually results in rusting or formation of a ferric coating which, for practical purposes, can be considered rusting. Actually, in the lower or water phase resulting from the collection of water in the bottom of a tank, one accumulates rust whereas in the upper oil phase not only rust may appear but also some other characteristic change which sometimes is referred to as a blister.

Particular additives herein described contribute valuable rust inhibiting properties to the fuel oil. An ordinary steel plate was suspended in 100 cc. of oil for one week. The oils which were used had been shaken with water in a typical demulsification test procedure. Rust was determined by observation. The degree of rust in the various test is rated from 1 to 5. As one can expect, the additives which gave pronounced demulsifying effects and thus eliminated the bulk of water from the fuel oil likewise in many instances were the most effective in anti-rusting action. It should be noted, however, that there are additives which have pronounced effectiveness as demulsifying agents but still for some obscure reason do not produce nearly as effective results in rust inhibition. The results are included in the following table:

TABLE IV.—RUST INHIBITING PROPERTIES

An ordinary steel plate was suspended in 100 cc. of oil for one week. The additive treated oil had been shaken with 10 cc. of water before immersing the plate. Rust was determined by observation.

The degree of rusting is rated from 1 to 5 which includes:

(1) No rust
(2) Few spots
(3) Fair condition—rust occurring
(4) Poor—much rust
(5) Very poor—entire plate corroded

[#2 domestic heating oil "A"]

| Additive | Conc., p. p. m., 100% activity | Rating | |
|---|---|---|---|
| | | Oil phase | Water phase |
| None | | 5 | 5 |
| 2b | 35 | 1 | 1 |
| 2b | 70 | 1 | 1 |
| 2b | 150 | 1 | 1 |
| 3b | 35 | 1 | 2 |
| 3b | 70 | 1 | 2 |
| 3b | 150 | 1 | 1 |
| 7b | 35 | 2 | 2 |
| 7b | 70 | 1 | 1 |
| 7b | 150 | 1 | 1 |
| 9b | 35 | 1 | 2 |
| 9b | 70 | 1 | 1 |
| 9b | 150 | 1 | 1 |
| 1c | 35 | 2 | 2 |
| 1c | 70 | 2 | 1 |
| 1c | 150 | 1 | 1 |

In previous tests reference was made to oil which was a domestic heating oil indicated as "A." In tests following, two oils were used. The second oil which has been indicated as domestic heating oil is "B." The most desirable property that an additive can contribute to fuel oil is the prevention of solids or sludges, and thus eliminate solids which act as screen-clogging precipitates. Needless to say, if a filter were used instead of a screen it means the prevention of precipitates or solids which would clog the filter. Stated another way, the additive prevents sludge formation, tar formation and the like. No effort is made to differentiate between formation of sludge and preventing its precipitation by acting as a suspending agent or an anti-flocculent. A number of methods have been employed but one that has been established and has been frequently accepted is the procedure employed which the Shell Chemical Company in Bulletin SC 51-31 refers to as "The Small Scale Screen-Clogging Test."

PROPERTIES AS FUEL OIL INHIBITORS

These tests were run according to Shell Chemical Company bulletin Small Scale Test.

An oil is "passed" if its flow decrease is less than 20% and its filter rating is "2" or less. In the test, the oil is steamed, aged at 194° F. for 16 hours and then passed through a screen at a constant flow head. The flow decrease, due to sediment or emulsion forming on the screen is noted over a half-hour period. The residue from the ageing bottle is filtered, and the filter stain rated as follows:

(1) No stain
(2) Slight stain
(3) Dark stain
(4) Heavy stain
(5) Very heavy stain with actual sediment particles present The data obtained by these tests are shown in Table V immediately following:

TABLE V

| Additive | Conc., p. p. m., 100% activity | Heating oil "A" | | Heating oil "B" | |
|---|---|---|---|---|---|
| | | Percent decrease | Filter | Percent decrease | Filter |
| None | | 100 | 5 | 100 | 3 |
| 2b | 75 | 3.5 | 1 | 4 | 1 |
| 2b | 150 | 2.5 | 1 | 3.4 | 1 |
| 3b | 75 | 7.8 | 3 | 10.1 | 2 |
| 3b | 150 | 5.4 | 1 | 8.7 | 1 |
| 6b | 75 | 7.6 | 2 | 8.9 | 2 |
| 6b | 150 | 6.9 | 2 | 7.2 | 1 |
| 7b | 75 | 5.5 | 2 | 6.0 | 1 |
| 7b | 150 | 4.2 | 1 | 5.3 | 1 |
| 1c | 75 | 4.4 | 3 | 5.6 | 2 |
| 1c | 150 | 3.8 | 2 | 5.1 | 2 |

It is to be noted that stabilization of hydrocarbon fuel as herein described may be accomplished within a low range of approximately 0.0025% to about 0.005%. On the other hand, in numerous instances it is desirable to use a distinctly higher range as for example an amount of additive equal to 0.001 to 5% by weight of the fuel oil. See aforementioned U. S. Patent 2,553,183 and also U. S. Patent 2,711,947, dated June 28, 1955, to Smith et al. In actual use it is our preference generally to employ derivatives of the kind herein employed in 40 p. p. m. to 500 p. p. m. or ratios of 0.004% to 0.05%. It is convenient to make a solution of the additives such as a 25% or 50% solution in some suitable solvent such as high boiling aromatic solvent or the like and add a solution purely for convenience in measurement.

TABLE VI.—COLOR STABILIZING PROPERTIES

The fuel oil, having free access to the air, containing the additive in the concentration indicated, was aged for two days at a temperature of 200° F. The oil was then allowed to cool and the color of the oil measured in terms of the "Tag-Robinson Colorimeter Number." Number 21 equals water white, Number 1 is black.

| Additive | Conc., p. p. m., 100% activity | Colorimeter number | |
|---|---|---|---|
| | | Domestic heating oil A— initial color 17.5 | Domestic heating oil B— initial color 15 |
| None | | 1 | 3 |
| 2b | 35 | 12 | 10 |
| 2b | 70 | 14 | 11.5 |
| 2b | 150 | 14 | 12 |
| 3b | 35 | 8 | 10 |
| 3b | 70 | 9 | 10.25 |
| 3b | 150 | 10 | 12 |
| 7b | 35 | 11.25 | 8 |
| 7b | 70 | 13 | 10 |
| 7b | 150 | 14 | 9.5 |
| 9b | 35 | 8 | 7.25 |
| 9b | 70 | 11.25 | 9.5 |
| 9b | 150 | 12 | 11 |
| 1c | 35 | 8.25 | 9.25 |
| 1c | 70 | 9.5 | 9.75 |
| 1c | 150 | 10.25 | 10.5 |

As previously noted, the present invention is a sub-generic aspect of our broader invention which is described in our co-pending application, Serial No. 546,004, filed November 9, 1955. Immediately following are three tables, Numbers VII, VIII, and IX, in which there is a comparison between rust inhibition, fuel oil inhibitor, color stability, of typical examples of the broad class described in our co-pending application, Serial No. 546,004, filed November 9, 1955, and also typical members of the much preferred sub-generic class herein specified. It will be noted in a general way that starting with the same raw materials and in some instances, for instance, less expensive raw materials, one can produce an additive which is apt to be 20% to 25% better than the broad class defined in our application, Serial No. 546,004, filed November 9, 1955, although said broad class taken by and large give more effective additives than many presently available.

Over and above the properties indicated in the three subsequent tables it is to be noted that not infrequently physical properties, solubility, cold test, etc., are factors, which enter into consumer acceptance. The esters of the kind herein defined invariably and inevitably have better physical properties than many typical members of the broad class described in our co-pending application, Serial No. 546,004, filed November 9, 1955.

TABLE VII

| Comparison of rust inhibition | | Rating | |
|---|---|---|---|
| Additive | Conc., p. p. m., 100% activity | Oil phase | Water phase |
| 2b | 35 | 1 | 1 |
| 2b | 70 | 1 | 1 |
| 2b | 150 | 1 | 1 |
| 3b | 35 | 1 | 2 |
| 3b | 70 | 1 | 2 |
| 3b | 150 | 1 | 1 |
| 7b | 35 | 2 | 2 |
| 7b | 70 | 1 | 1 |
| 7b | 150 | 1 | 1 |
| (1d) Notes 1 and 2 | 35 | 2 | 2 |
| Do | 70 | 2 | 2 |
| Do | 150 | 2 | 2 |
| (8d) Notes 1 and 2 | 35 | 3 | 4 |
| Do | 70 | 2 | 3 |
| Do | 150 | 2 | 3 |
| (7d) Notes 1 and 2 | 35 | 3 | 2 |
| Do | 70 | 2 | 1 |
| Do | 150 | 2 | 1 |

NOTE 1.—The numbers in parentheses are those used in our co-pending application, Serial No. 546,004, and are used to facilitate comparison.

NOTE 2.—(1d) The monostearic acid amide of diethylene triamine was prepared in the usual manner and oxyethylated by the usual procedure so as to introduce 5 moles of ethylene oxide per amide molecule.

(7d) The monostearic acid amide of methyl aminopropylamine was prepared in the usual manner and oxyethylated by the usual procedure so as to introduce 6 moles of ethylene oxide per amide molecule.

(8d) The monolauric acid amide of diethylene triamine was prepared in the usual manner and oxypropylated to introduce 8 moles of propylene oxide per amide molecule. This was then oxyethylated to introduce 4 moles of ethylene oxide per amide molecule.

TABLE VIII.—COMPARISON AS FUEL OIL INHIBITORS

| Additive | Conc., p. p. m., 100% activity | Heating oil "A" | | Heating oil "B" | |
|---|---|---|---|---|---|
| | | Percent decrease | Filter | Percent decrease | Filter |
| 2b | 75 | 3.5 | 1 | 4 | 1 |
| 2b | 150 | 2.5 | 1 | 3.4 | 1 |
| 2b | 75 | 7.8 | 3 | 10.1 | 2 |
| 3b | 150 | 5.4 | 1 | 8.7 | 1 |
| 6b | 75 | 7.6 | 2 | 8.9 | 2 |
| 6b | 150 | 6.9 | 2 | 7.2 | 1 |
| (1d) | 75 | 18.7 | 3 | 15.1 | 2 |
| (1d) | 150 | 12.4 | 2 | 13.9 | 1 |
| (7d) | 75 | 10.8 | 2 | 15.4 | 2 |
| (7d) | 150 | 8.2 | 1 | 9.7 | 2 |

TABLE IX.—COMPARISON AS COLOR STABILIZER

| Additive | Conc., p. p. m., 100% activity | Colorimeter number | |
|---|---|---|---|
| | | Heating oil "A"— initial color 17.5 | Heating oil "B"— initial color 15 |
| 2b | 35 | 12 | 10 |
| 2b | 70 | 14 | 11.5 |
| 2b | 150 | 14 | 12 |
| 3b | 35 | 8 | 10 |
| 3b | 70 | 9 | 10.25 |
| 3b | 150 | 10 | 12 |
| 7b | 35 | 11.25 | 8 |
| 7b | 70 | 13 | 10 |
| 7b | 150 | 14 | 9.5 |
| (1d) | 35 | 5 | 8.25 |
| (1d) | 70 | 7.25 | 8.25 |
| (1d) | 150 | 8 | 9.5 |
| (7d) | 35 | 7 | 7.25 |
| (7d) | 70 | 9.0 | 9.0 |
| (7d) | 150 | 9.25 | 9.0 |

Having thus described our invention, what we claim as new and desire to secure by Letters Patent, is:

1. A fuel composition comprising a major portion of a hydrocarbon fuel oil and a minor portion, sufficient to stabilize the fuel oil against the formation of sludge and undesirable color bodies, of a member of the class consisting of (A) an oil soluble and surface-active chemical compound which is an esterified alkylene oxide addition product of a polyamine formed by esterification of the addition product with a monocarboxy higher fatty acid and which compound has the following structural elements and characteristics: (a) at least 2 nitrogen atoms; (b) at least one basic nitrogen atom; (c) at least one alkyleneoxy radical derived from alkylene monoepoxide having not more than 4 carbon atoms; (d) one acyl radical derived from a higher fatty acid having at least 8 carbon atoms; (e) one acyl radical being present as part of an ester radical; (f) said compound being free from any cyclic radical; (g) said compound being free from any acyl radical present as part of an amide radical; and (B) acid addition salts thereof.

2. A fuel oil composition comprising a major portion of a hydrocarbon fuel oil and a minor portion, sufficient to stabilize the fuel oil against the formation of sludge and undesirable color bodies, of a member of the class consisting of (A) an oil soluble and surface-active chemical compound which is an esterified alkylene oxide addition product of a polyamine formed by esterification of the addition product with a monocarboxy higher fatty acid and which compound has the following structural elements and characteristics: (a) at least 2 basic nitrogen atoms; (b) at least one alkyleneoxy radical derived from alkylene monoepoxide having not more than 4 carbon atoms; (c) one acyl radical derived from a higher fatty acid having at least 8 carbon atoms; (d) one acyl radical being present as part of an ester radical; (e) said compound being free from any cyclic radical; (f) said compound being free from any acyl radical present as part of an amide radical; and (B) acid addition salts thereof.

3. A fuel oil composition comprising a major portion of a hydrocarbon fuel oil and a minor portion, sufficient to stabilize the fuel oil against the formation of sludge and undesirable color bodies, of a member of the class consisting of (A) an oil soluble and surface-active chemical compound which is an esterified alkylene oxide addition product of a polyamine formed by esterification of the addition product with a monocarboxy higher fatty acid and which compound has the following structural elements and characteristics: (a) at least 2 basic nitrogen atoms; (b) at least one alkyleneoxy radical derived from alkylene monoepoxide having not more than 4 carbon atoms; (c) one acyl radical derived from a higher fatty acid having at least 8 carbon atoms; (d) one acyl radical being present as part of an ester radical; (e) said compound being free from any cyclic radical; (f) said compound being free from any acyl radical having less than 8 carbon atoms; (g) said compound being free from any acyl radical present as part of an amide radical; and (B) acid addition salts thereof.

4. A fuel oil composition comprising a major portion of a hydrocarbon fuel oil and a minor portion, sufficient to stabilize the fuel oil against the formation of sludge and undesirable color bodies, of an oil soluble and surface-active chemical compound which is an esterified alkylene oxide addition product of a polyamine formed by esterification of the addition product with a monocarboxy higher fatty acid and which compound has the following structural elements and characteristics: (a) at least one alkyleneoxy radical derived from alkylene monoepoxide having not more than 4 carbon atoms; (c) one acyl radical derived from a higher fatty acid having at least 8 carbon atoms; (d) one acyl radical being present as part of an ester radical; (e) said compound being free from any cyclic radical; (f) said compound being free from any acyl radical having less than 8 carbon atoms; and (g)

said compound being free from any acyl radical present as part of an amide radical.

5. A fuel oil composition comprising a major portion of a hydrocarbon fuel oil, and a minor portion sufficient to stabilize the fuel oil against the formation of sludge and undesirable color bodies, of an esterified alkylene oxide addition product of a polyethylene amine formed by reaction involving equimolar proportions of the addition product and the higher fatty acid with elimination of one mole of water and conforming to the structure

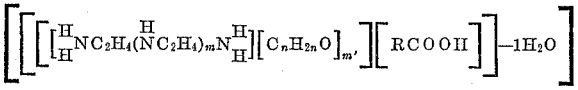

in which $m$ is an integer not over 7 including zero; $m'$ is a whole number at least equal to $m$ plus 4; and $n$ is a whole number varying from 2 to 4.

6. A fuel oil composition comprising a major portion of a hydrocarbon fuel oil, and a minor portion sufficient to stabilize the fuel oil against the formation of sludge and undesirable color bodies, of an esterified alkylene oxide addition product of a polyethylene amine formed by reaction involving equimolar proportions of the addition product and the higher fatty acid with elimination of one mole of water and conforming to the structure

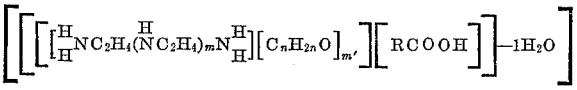

in which $m$ is an integer not over 7 including zero; $m'$ is a whole number equal to $m$ plus 4; and $n$ is a whole number varying from 2 to 4.

7. The composition of claim 6 with the proviso that $n$ is 2.

8. The composition of claim 6 with the proviso that $n$ is 2 and RCOOH is a saturated fatty acid.

9. The composition of claim 6 with the proviso that $n$ is 2 and RCOOH is stearic acid.

10. The composition of claim 6 with the proviso that $n$ is 2, RCOOH is stearic acid, and $m$ is zero.

11. The composition of claim 6 with the proviso that $n$ is 2, RCOOH is stearic acid, and $m$ is one.

12. The composition of claim 6 with the proviso that $n$ is 2, RCOOH is stearic acid, and $m$ is two.

13. The composition of claim 6 with the proviso that $n$ is 2, RCOOH is stearic acid, and $m$ is three.

14. The composition of claim 6 with the proviso that $n$ is 2, RCOOH is stearic acid, and $m$ is four.

References Cited in the file of this patent

UNITED STATES PATENTS

| | | |
|---|---|---|
| 2,187,823 | Ulrich et al. | Jan. 23, 1940 |
| 2,375,529 | De Groote et al. | May 8, 1945 |
| 2,609,931 | Rodman et al. | Sept. 9, 1952 |
| 2,681,354 | Kelley et al. | June 15, 1954 |

---

Notice of Adverse Decision in Interference

In Interference No. 91,008 involving Patent No. 2,854,323, Kwan-Ting Shen, V. L. Stromberg and A. H. Smith, Fuel oil composition, final judgment adverse to the patentees was rendered Sept. 21, 1962, as to claims 2, 6, 7, 8 and 9.
[*Official Gazette November 6, 1962.*]

---

Disclaimer 2,854,323.—*Kwan-Ting Shen*, Brentwood, *Verner L. Stromberg*, Shrewsbury, and *Alvin Howard Smith*, Glendale, Mo. FUEL OIL COMPOSITION. Patent dated Sept. 30, 1958. Disclaimer filed Aug. 13, 1963, by the assignee, *Petrolite Corporation*.

Hereby enters this disclaimer to claims 1 through 10 of said patent.
[*Official Gazette October 29, 1963.*]

Notice of Adverse Decision in Interference

In Interference No. 91,008 involving Patent No. 2,854,323, Kwan-Ting Shen, V. L. Stromberg and A. H. Smith, Fuel oil composition, final judgment adverse to the patentees was rendered Sept. 21, 1962, as to claims 2, 6, 7, 8 and 9.

[*Official Gazette November 6, 1962.*]

Disclaimer 2,854,323.—*Kwan-Ting Shen*, Brentwood, *Verner L. Stromberg*, Shrewsbury, and *Alvin Howard Smith*, Glendale, Mo. FUEL OIL COMPOSITION. Patent dated Sept. 30, 1958. Disclaimer filed Aug. 13, 1963, by the assignee, *Petrolite Corporation*.

Hereby enters this disclaimer to claims 1 through 10 of said patent.
[*Official Gazette October 29, 1963.*]